(12) United States Patent
Kroeger et al.

(10) Patent No.: US 7,480,542 B2
(45) Date of Patent: Jan. 20, 2009

(54) CLOSED LOOP INTERACTIVE CONTROLLER

(75) Inventors: Charles R. Kroeger, Upland, CA (US); Rolf T. Anderson, Glendora, CA (US); Keith A. Rubow, Glendora, CA (US)

(73) Assignee: Caco Pacific Corporation, Covina, CA (US)

( * ) Notice: Subject to any disclaimer, the term of this patent is extended or adjusted under 35 U.S.C. 154(b) by 0 days.

(21) Appl. No.: 10/351,191

(22) Filed: Jan. 23, 2003

(65) Prior Publication Data

US 2003/0154004 A1    Aug. 14, 2003

Related U.S. Application Data

(63) Continuation of application No. 09/358,323, filed on Jul. 21, 1999, now Pat. No. 6,529,796.

(51) Int. Cl.
*B29C 45/00* (2006.01)

(52) U.S. Cl. .................. 700/202; 264/40.5; 425/144

(58) Field of Classification Search ............... 700/197, 700/200–205, 299, 300; 425/135, 143, 144; 264/40.1, 40.6
See application file for complete search history.

(56) References Cited

U.S. PATENT DOCUMENTS 5,206,033 A * 4/1993 Stastny .................. 425/143
5,229,952 A * 7/1993 Galloway et al. ........... 700/200
5,589,114 A * 12/1996 Evans ..................... 264/40.6
5,662,946 A * 9/1997 Pratt et al. ............... 425/190
5,795,511 A * 8/1998 Kalantzis et al. ......... 264/40.6
5,972,256 A * 10/1999 Wurst et al. ............. 264/40.1
6,000,831 A * 12/1999 Triplett .................... 700/204
6,421,577 B1 * 7/2002 Triplett .................... 700/204

\* cited by examiner

*Primary Examiner*—Kidest Bahta
(74) *Attorney, Agent, or Firm*—Sheldon Mak Rose & Anderson

(57) ABSTRACT

An injection mold apparatus has multiple injection zones, each zone having at least one heater and at least one temperature sensor generating a temperature indicating signal. A power source provides power to the heaters. A controller controls the temperature of at least some of the zones. For efficiency, the controller has two separate processors, a data-receiving processor for receiving temperature indicating signal from each sensor as well as power signals, and a control processor for receiving data from the data-receiving processor and for controlling the amount of power provided to the heaters. Preferably, the control is in a housing, with the housing mounted directly on the mold. Modified PID calculations are utilized. Power calculations for the amount of power to the heaters utilizes a modulo based algorithm.

8 Claims, 14 Drawing Sheets

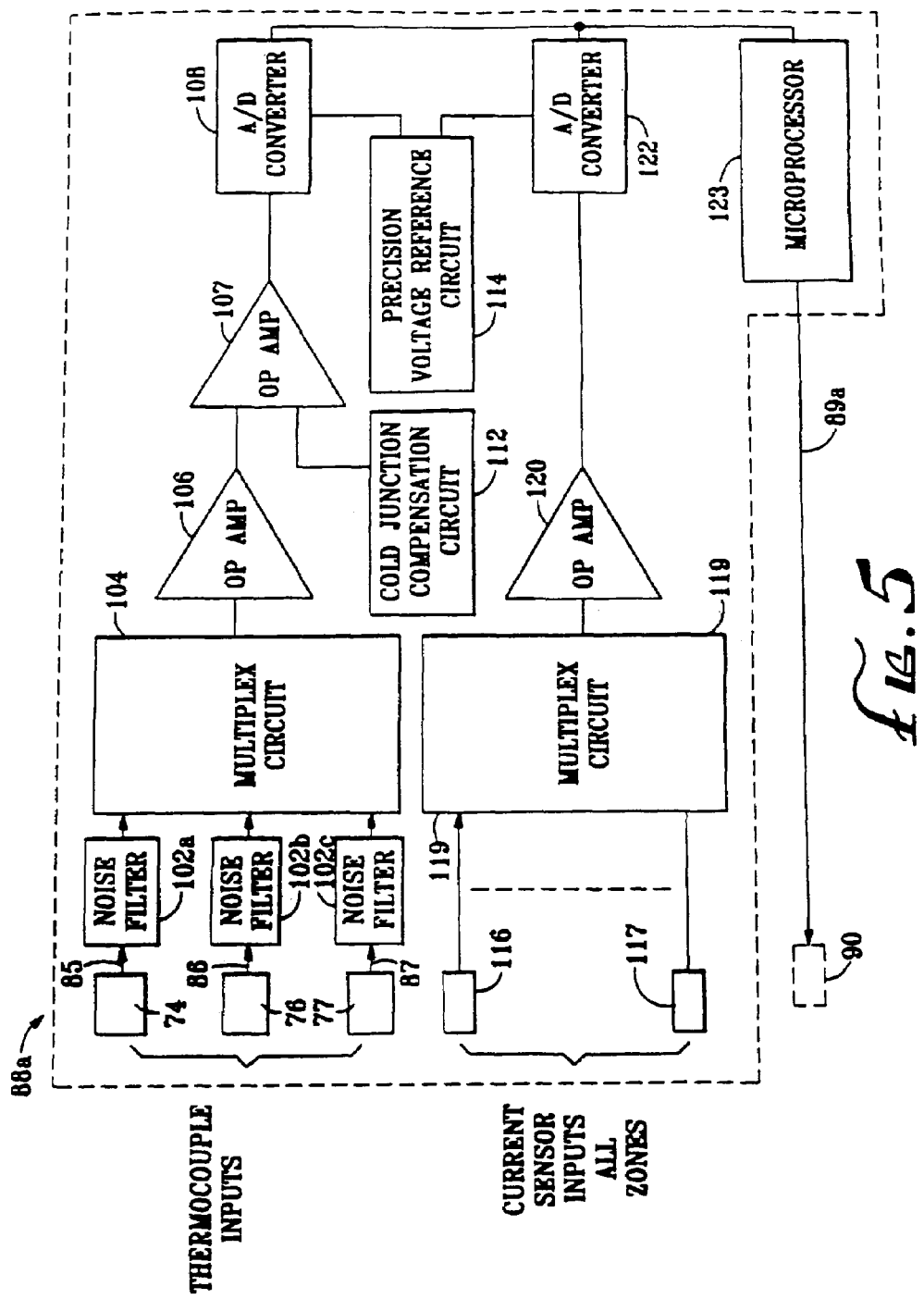

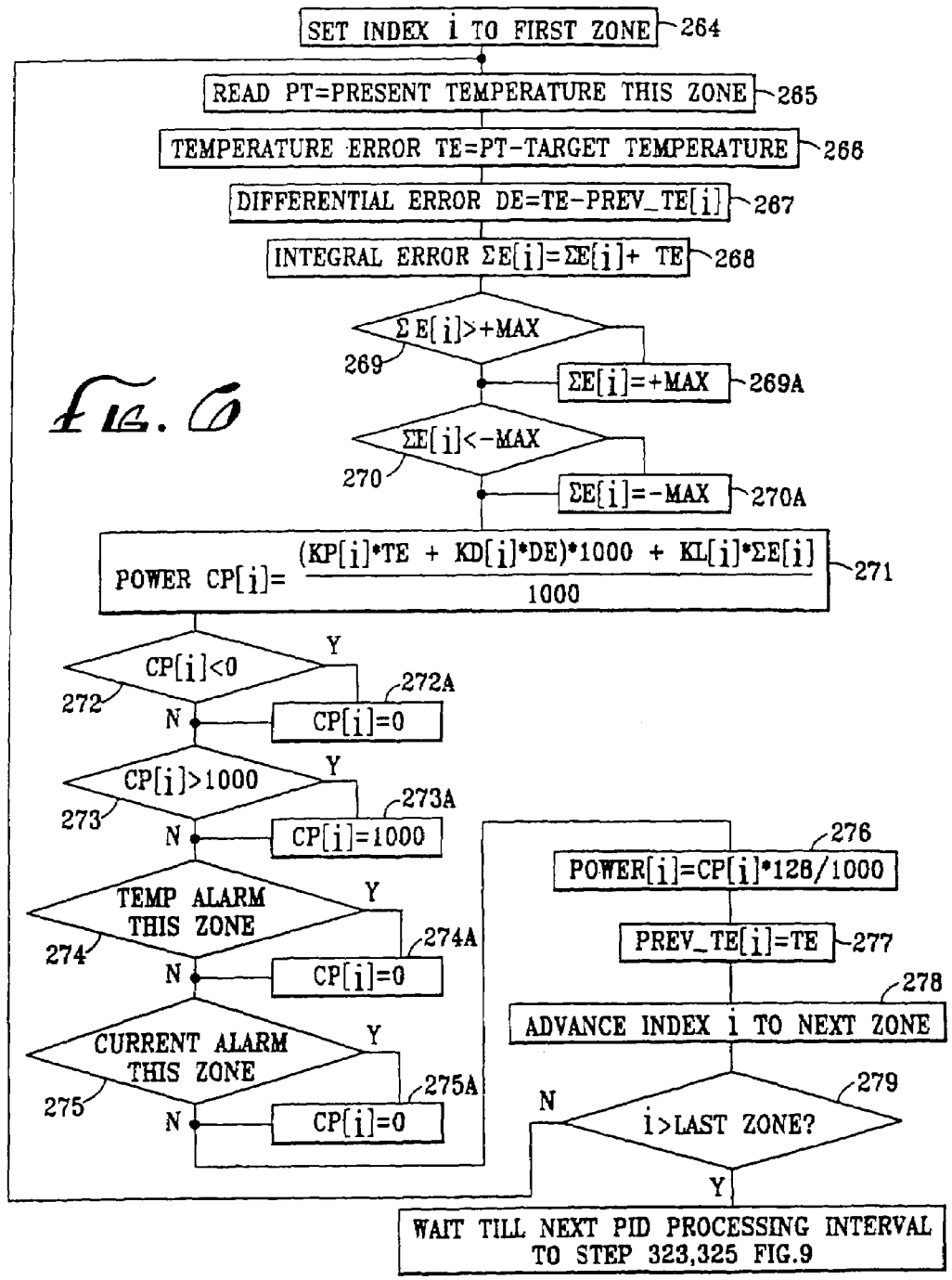

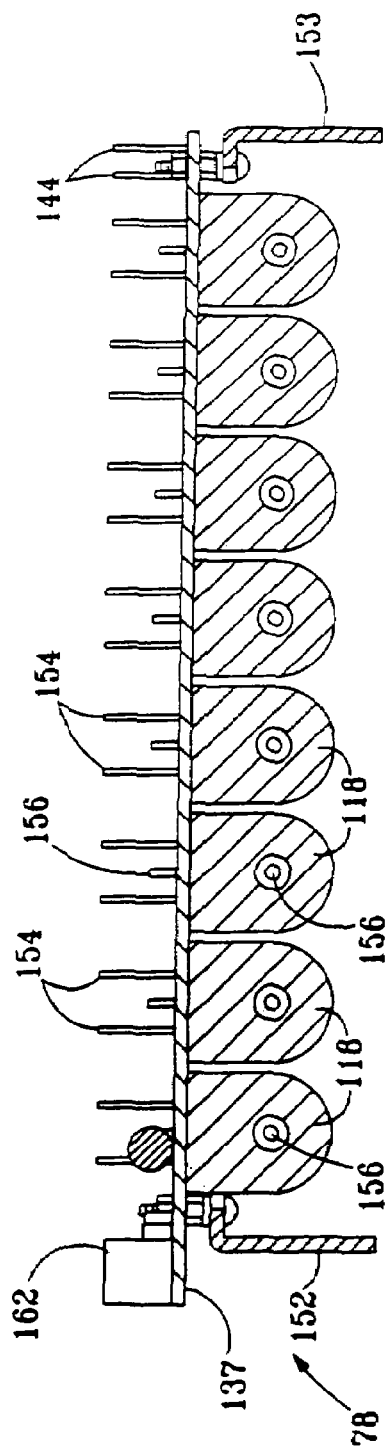
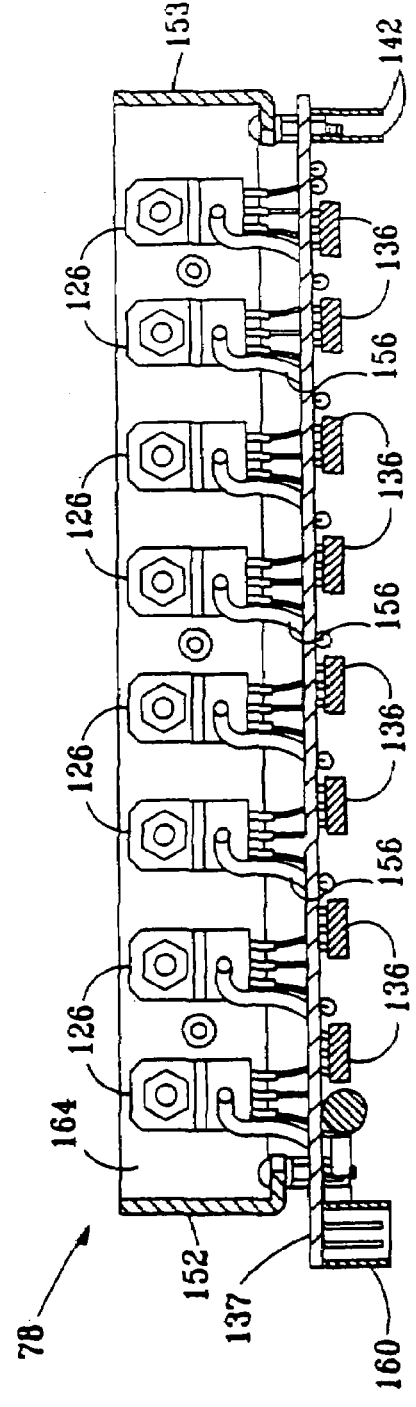

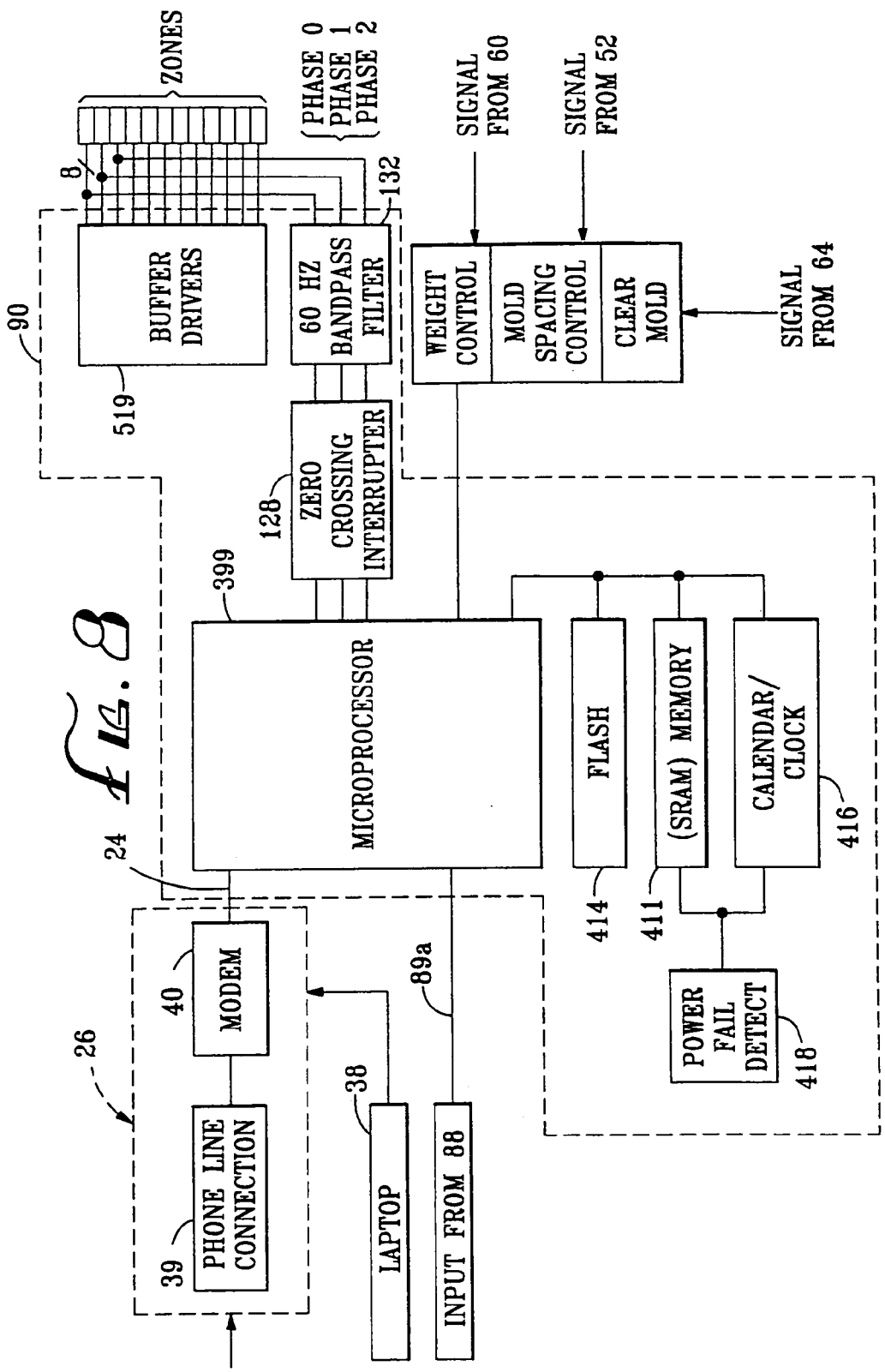

CLOSED LOOP INTERACTIVE CONTROLLER

CROSS-REFERENCE TO RELATED APPLICATION

This application is a continuation of U.S. patent application Ser. No. 09/358,323 filed on Jul. 21, 1999 now U.S. Pat. No. 6,529,796.

COPYRIGHT NOTICE

A portion (Appendices A-1, 2, 3, and 4) of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

This invention relates to a controller integrated with apparatus for the purpose of controlling the operational parameters of the apparatus, and more particularly, to control circuitry operated by processors for a closed loop, self-remedial system. A particular application of the present invention relates to molds utilized with a plastic mold apparatus, such as a hot runner injection mold apparatus.

In the injection mold industry, it is known to have an injection mold apparatus having from one to two hundred plus molding stations. Molds having ninety-six stations are common. Each station is equipped with the functional elements necessary for carrying out the molding process, including a mold cavity, resin feed equipment, and heaters and chilling fluid channels for maintaining resin and the mold in a proper molding condition. In a typical injection mold process, the following steps sequentially take place: (1) the mold cavity closes; (2) molten resin is injected into the closed mold; (3) once the injected resin hardens, the mold is opened; and (4) a formed part is ejected from the opened mold. Each mold cavity can undergo changes in spacing as a result of repeated opening and closing as each finished molded component is ejected. It is critical that the mold return to its precise spacing after the components are ejected and the mold is readied for the next batch. Moreover, in molding components, it is critical to maintain the temperature of the resin within a few degrees of its desired melt temperature in order to achieve the proper quality of the molded components. Given the high production rate of injection molding apparatus, almost instantaneous recognition that the system is out of temperature control is needed.

Conditions in the mold that are important in terms of product quality are the resin temperature, the mold temperature, and mold pressure. If these conditions are out of set ranges, the quality of the final molded components can be adversely affected. For example the molded components can emerge with extraneous plastic along the edges, which is known as "flash".

Other problems incurred with molding parts are variation and inconsistency in the weight and quality of the components.

Conventional techniques for controlling operational parameters of a mold to maintain the parameters within a range of acceptable reference parameters involves monitoring the various parameters with sensors. The data detected by the sensors is transmitted as analog signals to a controller. Certain examples of the prior art are U.S. Pat. No. 5,551,857, issued Sep. 3, 1996, to Osami Fujioka, which discloses controls for a molding apparatus 39 (FIG. 1); and U.S. Pat. No. 5,795,511, issued Aug. 18, 1998, to Peter G. Kalantzis, which discloses a memory function in FIG. 2 for the operational parameters of the hot side 24 of an injection molding machine.

Some of the disadvantages of prior art techniques for monitoring and controlling the operational parameters of a mold apparatus are attributable to the use of large, stand alone controllers, external to the mold. These controllers are expensive, and require large kilowatt power sources and large heavy cables for connection. The cables that provide the kilowatt power generates resistance in the cables and produces unwanted noise that can result in inaccurate signals from the various sensors. Moreover, a large number of connectors need to be made to connect the mold controller to (i) the mold, (ii) the injection mold apparatus, and (iii) a power source. Effecting these connections delays start-up of the equipment, and can contribute to high labor costs for production of molded parts.

In view of the disadvantages of prior art techniques, there is a need for control apparatus, such as for an injection mold apparatus, and methods for operating the apparatus, that permit accurate, automatic and inexpensive control of operational parameters while minimizing production of defective parts.

SUMMARY

The present invention is directed to an apparatus and method that satisfy this need. In particular, in one aspect of the present invention, an apparatus has multiple zones, each zone having at least one heater and/or chiller system, and at least one temperature sensor outputting a temperature indicating signal. A power source provides power to any heater, chilling fluid is provided to any chiller system, and a controller controls the temperature of at least some of the zones. The controller comprises a data-receiving processor and a separate control processor. The data-receiving processor receives a temperature indicating signal from each sensor. The separate control processor receives data from the data-receiving processor and controls power provided to the heaters and/or the temperature of chilling fluid provided to the chilling system in response to the data received from the data-receiving processor. Each processor has its own central processing unit.

Typically the apparatus is a hot runner injection mold having multiple injection zones. Typically the controller comprises a closed loop feed back circuit. Preferably the data-receiving processors also calculate the root mean square current of each heater and/or root mean square of the output temperature of fluid from the chiller.

To avoid the problem of the expensive and error-inducing cables, preferably the controller is in a housing, where the housing is mounted on the mold. If necessary, there can be an insulating air gap between the housing and the mold to avoid heat from the mold overheating the processors.

In order to avoid production of defective parts, preferably the apparatus comprises an alarm responsive to an out of control condition such as incomplete ejection of a molded component from the mold, out of specification component quality, irregular spacing between mold components, and incorrect weight of molded components. The apparatus can comprise an automatic or manual control switch responsive to the alarm for shutting down any zone responsible for the out of control condition.

The apparatus typically utilizes a power source providing AC current to the heaters. The control processor compares the actual temperature of each zone against its target temperature. The control processor provides an output signal for regulating the power source, and controls the total number of complete current cycles provided by the power source to each heater. This is accomplished by calculating the number of current cycles required to achieve the target temperature based on the difference between actual temperature and target temperature, and then comparing the number of current cycles needed against the actual number of cycles being provided to each heater. For this purpose, the apparatus includes a detector, such as a transformer, for detecting the amount of current provided to each heater.

The data-receiving processor and control processor preferably are on separate printed circuit boards. Because the data-receiving function of data received from the heaters and the current sensors is processor-intensive for a large number of zones, the data-receiving processor can comprise separate processor modules, each module having its own CPU. For example, for 96 zones each module can be used for 48 zones.

In a preferred control processor, the amount of power needed for each heater is determined with a PID calculation, where a range of limits is provided for the amount the power to be applied, independent of the PID calculation to prevent over heating the system.

To minimize the calculation load on the first processor, preferably the RMS value for detected current utilizes an algorithm to calculate the sum of squares which requires less processor capacity, as detailed below.

To be certain, for power efficiency, that AC power is provided in complete cycles, the system includes a zero cross-over detector and controls for starting and ending power application at zero cross-over.

Optionally, the present invention monitors each molding station with a sensor during the resin injection step. If the sensor detects that the mold is improperly opening during the injection step, which can cause flash, the system automatically increases the pressure utilized to keep the mold closed.

The present invention also includes a system and method for starting up the apparatus, so that all zones reach a startup target temperature at substantially the same time. This is effected by determining a heat-up time for each zone, where the heat-up time is equal to the amount of time required to heat up the adjacent portion of the apparatus to its start-up temperature with the heater on substantially full power. The heat-up times of the heaters are compared to identify the longest heat-up time. The amount of heat-up power for each heater is determined, the heat-up power for each zone being the amount required to heat up the respective adjacent portions of the apparatus to its start-up temperature in the heat-up time. Then there is applied to each heater simultaneously its respective heat-up power, with the result that all portions of the apparatus reach their target temperature at substantially the same time.

In a more general sense, a system according to the present invention controls the operation of an apparatus having a plurality of operating zones, where the system comprises at each zone, at least one operating element (such as a heater), and a detector (such as a transformer) generating an operating signal representative of the operating state of the operating element (such as power to the heater). An input is provided for each operating element to vary an operational parameter (such as temperature) of each zone. A sensor senses the operational parameter of each zone and generates a corresponding analog sensing signal. The system includes a controller that comprises a first processor for digitizing the signals and determining from the signal the operating state of the operating element and the operational parameter of each zone. The controller also includes a second processor for performing a PID calculation for each zone based on the operating state and the operational parameter to determine the amount of input of each operating element to maintain the operational parameter of each zone within a selected range. The second processor preferably limits the maximum amount of input determined by the PID calculation to prevent damage to the apparatus and operating elements.

As a result of the combination of these features of the present invention, including separate processors for data-receiving and control, a controller mounted directly on the apparatus without cables, an efficient algorithm for calculating RMS values, use of full AC cycles for power to the heaters, and a system for detecting out of control conditions, it is possible to efficiently, effectively, and automatically manufacture molded parts.

DRAWINGS

These and other features, aspects and advantages of the present invention will become better understood from the following description, appended claims, and accompanying drawings where:

FIG. 5 is block diagram of the temperature and current sensing data modules of the IPM of FIG. 1.

FIG. 6 is a software flow chart of the computations carried out for making decisions on power requirements for heaters of the mold of FIG. 1.

FIGS. 7C and 7D are sectional views of the power driver unit of FIGS. 7A and 7B, taken on lines 7C-7C and 7D-7D, respectively, in FIG. 7A.

FIG. 8 is a block diagram of a processor module that is part of the IPM of FIG. 1 that controls the timing of the application of the calculated power to mold zones.

Appendices A-1 through A-4, which are incorporated herein by reference, are descriptions and software listings of a preferred embodiment of the present invention.

DESCRIPTION

Overall Apparatus

Figure 1:
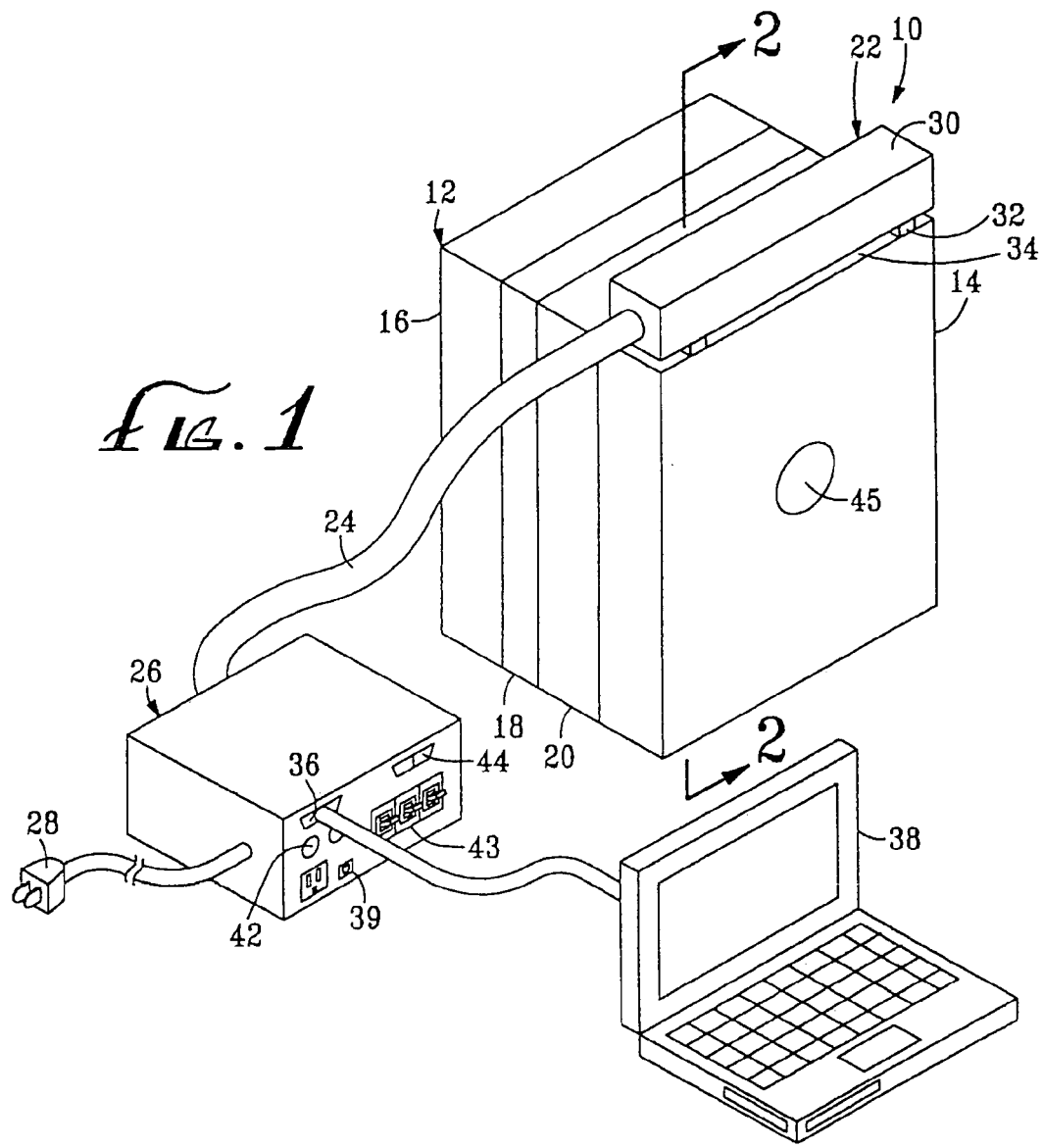
FIG. 1 is a perspective view of a mold apparatus according to the present invention, showing an interactive process manager (IPM) integrated with a mold having multiple zones.
Figure 2:
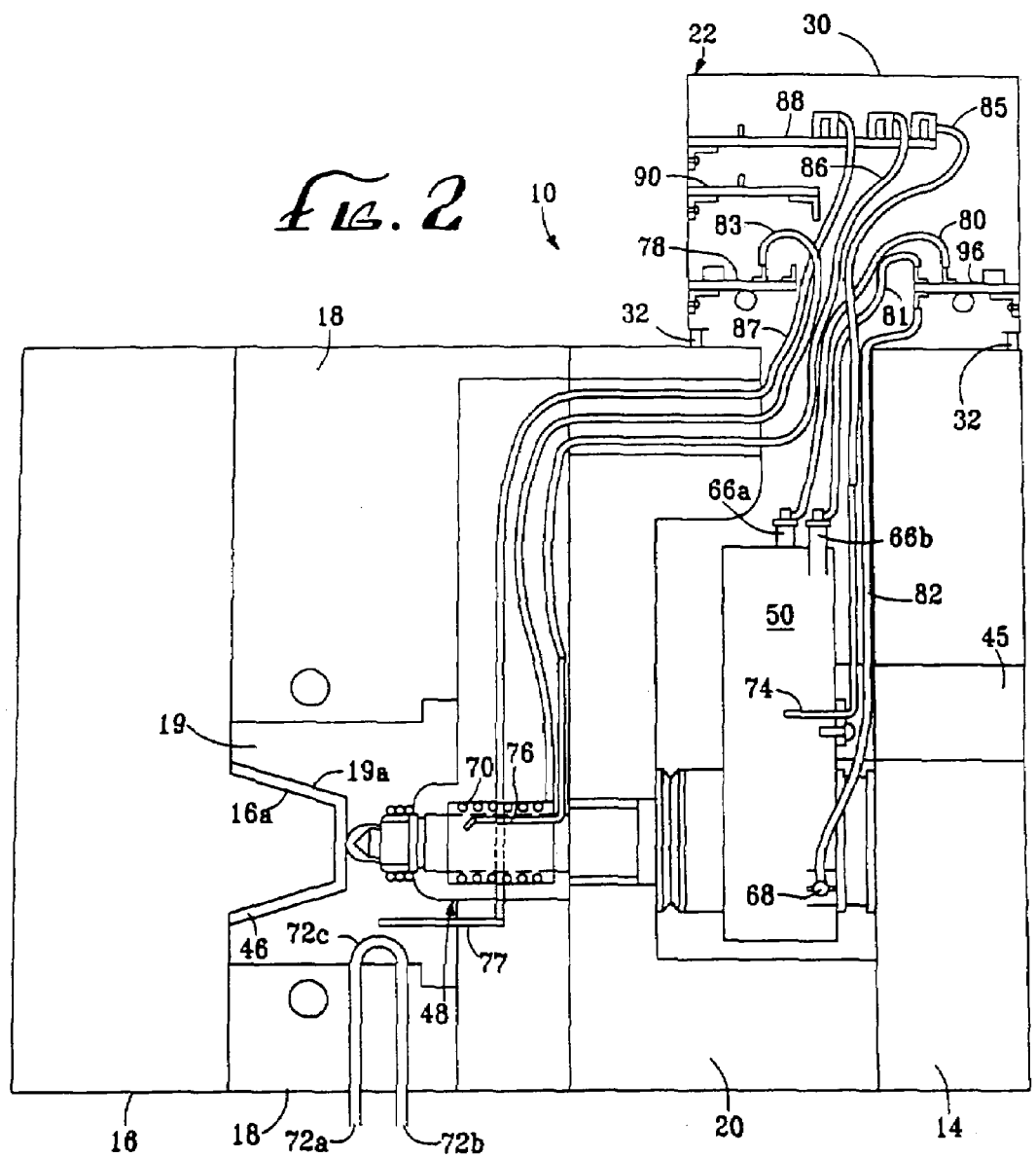
FIG. 2 is a schematic view of the inside of the mold of FIG. 1, taken along line 2-2 in FIG. 1.

Referring to FIGS. 1 and 2, there is shown the general arrangement of a mold apparatus 10 according to the present invention. The mold apparatus 10 comprises multiple molding stations, each having a hot runner injection mold 12. As is typical in the industry, the mold 12 comprises a manifold backing plate 14, a core retainer plate 16, which captures and holds in alignment a cavity plate 18, a mold cavity insert 19 in the cavity plate 18, and a manifold plate 20. Integral with the mold 12 is an interactive process manager (IPM) 22 connected via a data communication/power cable 24 to a communication/power unit 26 which, in turn, is connected to an AC power source through a power cord 28.

The IPM 22 includes a housing 30 affixed to the mold, optionally, by leg elements 32 that support the IPM above the mold 12, providing a heat insulating air space 34 to minimize any heat transfer from the IPM 22 to the mold 12. Unlike prior art controllers, the IPM is directly attached to the mold 12, and only a single connection needs to be made with the cable 24 to the communications/power unit 26.

Although the concept of an integrated IPM 22 is described herein in terms of a molding process in a hot runner injection mold, it is intended that it can be applied to a wide range of apparatus whose successful operation depend on measurable parameters that meet specific operating conditions important to turning out an acceptable end product, and where there is a need for this system to correct itself without outside intervention. This includes cold runner injection molds, spin molds, blow molds, and the like.

The communication/power unit 26 is equipped with a PC (personal computer) terminal 36 which can be input information from a local PC 38, or optionally a user can communicate through a remote computer connected to a phone line connection 39 for an internal modem 40 (FIG. 8). The communication unit 26 additionally is equipped with status indicator lamps 42, circuit breakers 43, and communication connection 44 for optional connection to a network controlling other apparatus.

Figure 3:
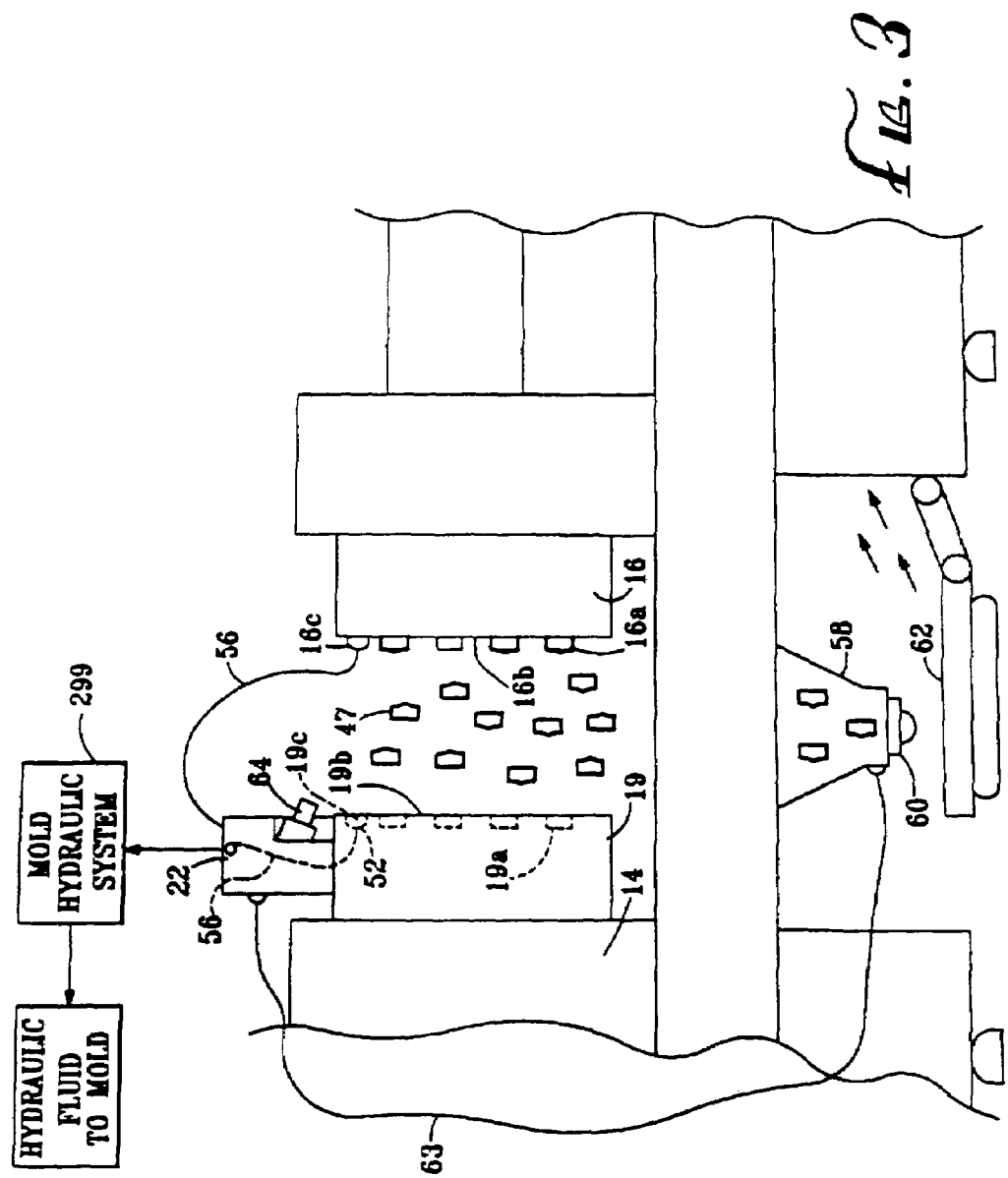
FIG. 3 is a sketch illustrating techniques for controlling and monitoring the condition of the mold of FIG. 1 and the condition of molded components for the mold of FIG. 1.

As shown in FIGS. 2 and 3, the IPM 22 is integral with the mold 12. The core retainer plate 16 and the mold cavity insert 19, when aligned together, form a mold cavity 46, into which molten resin is injected through an opening 45, to form a molded component 47. The core retainer plate 16 and the mold cavity insert 19 contain the male and female mold portions 16a, 19a, respectively, that shape molded components 47. The manifold plate 20 and the cavity plate 18 are constructed to receive a hot runner injection nozzle body 48 equipped with a nozzle tip that communicates with the mold cavity 46 through an injection gate (not illustrated). The plates 16 and 18 are restored in the proper spaced alignment after the mold separates to eject each molded component 47.

The manifold plate 20 is formed with a hot runner manifold 50 for supplying resin melt to the injection nozzle body 48.

Monitoring Irregular Molding Condition

FIG. 3 is a sketch illustrating monitors or detectors for controlling certain irregularities that can occur within the mold. With reference to FIG. 3, a transducer 52 fixed within the insert 19 for sensing the degree of movement between the parting line formed by the mold surfaces 19b and 16b. Alternatively, the transducer can be fixed to the core retainer plate 16. The quality of molded components 47 ejected from the mold cavity 46 requires that the cavity insert 19 and the core retainer plate 16 be restored exactly to their original position after every time the mold opens to eject molded components 47 and is subsequently restored to its operating condition. Preferably, the transducer 52 is a microswitch force sensor manufactured by Honeywell of Minneapolis, Minn., FS series device. The transducer 52 senses engagement of a projection 16c on surface 16b with a recess 19c in surface 19b. Cables 56 connect the transducer 52 to the IPM 22, which monitors the cavity plate line movement of the mold. In the event misengagement or misalignment is detected, the transducer 52 generates a millivolt signal through cables 56 for pick up by the IPM 22, which triggers a default signal in the communication unit 26 causing an alarm, and optionally, shutting down the affected mold. Also, an alarm in the IPM 22, as described below, is triggered.

It can be important to measure the aggregate weight of the components 47 as they are ejected from the mold cavity 46 to make certain that the mold is operating properly. For this purpose, a receiving tray 58 is placed in the gravitational path of the components 47. The tray is supported on an electronic scale 60 that weighs components ejected from the mold. A conveyor 62 removes finished components 47 to an appropriate collection station. Other types of removal and collection devices can be employed in place of the conveyor 62 such as, for example, a robotic sweep arm (not illustrated) to collect finished components. The signal generated by the electronic scale 60 represents the aggregate weight of the components. The signal is transmitted to the IPM 22 by a cable 63, where it is received in memory in the IPM. In the event the aggregate weight of the molded components 47 is outside a preselected weight parameter, as recorded in memory, an alarm is activated in the communication unit 26, and optionally, the affected mold is shut down.

The condition of the mold after each hardened molded component 47 is ejected is important, because it is necessary that the mold be ready to receive the molten resin for the next molding operation. A video camera 64 is positioned between the parting line surfaces 19b and 16b for identifying any failure of the components 47 to clear the mold cavity 46 after they are hardened or set. In particular, should a component fail to clear the cavity, the video picks up an obstruction, showing that surfaces 19b and 16b of the mold have one or more components stuck in a mold cavity. This signals an alarm, and optionally shuts down the mold. The video camera can also be used to remotely inspect the quality of the ejected components.

The instantaneous recognition by the IPM of any one of these irregular conditions can shut down the mold 12, and/or can enable an operator to take timely action to correct irregularities. This minimizes costly production of defective parts, which may otherwise go undetected for an inordinate length of time.

Temperature Control

Good temperature control of the mold requires control of the temperature of each molding station. Although the following discussion is directed to control of a single molding station provided with multiple heaters and multiple sensors, it should be understood that the IPM is simultaneously controlling the temperature of all molding stations of the mold 12, where each molding station can have one or more heaters and one or more sensors.

The quality of the molded components 47 depends, in part, on the ability of the system to maintain correct temperature. For this purpose, the hot runner manifold 50 typically has one or more heaters. For example, a pair of heaters 66a and 66b are provided in the resin feed structure at one end, and heaters 68 and 70 are located where the resin feeds to the hot runner nozzle body 48. The actual location and size of the heaters used depends on the type of resin employed and details of the molded component. A chilled water system (see FIGS. 2 and 13) includes a water chiller 71, a chilled water inlet line 72a, a chilled water outlet line 72b, and a chilling fluid path 72c in the mold for keeping the cavity plate 18 and insert 19 at a desired temperature. The thermal effect of the heaters 66, 68, and 70 on resin passing through the hot runner manifold 50 and the hot runner nozzle body 48 is measured by sensors 74 and 76, typically thermocouples, strategically positioned in the system. The thermal effect of the chilled water system, is measured by a sensor 77, typically, a thermocouple sensor. The sensor 74 is used to control heaters 66a, 66b, and 68; the sensor 76 is used to control the heater 70; and the sensor 77 is used to control the outlet temperature of water from the chiller 71. Thus, each molding station can have multiple zones, where each zone has a sensor and one or more heaters or chillers responsive to the temperature sensed by the sensor.

The heaters 66a, 66b, 68, and 70 are powered by alternating current, as described in detail below, by a power drive/current sensor module 78, to which they are connected by heater cables 80, 81, 82, and 83, respectively. Each sensor 74, 76, and 77 is connected to the IPM 22 by sensor cables 85, 86, and 87, respectively. Each sensor generates an analog signal which is transmitted by the sensor cables to the IPM 22, which is equipped with a processor for processing the measured signals, and thus controlling the power driver/current sensor module 78 and the chiller 71, in a closed loop system, as described in detail below.

Referring to FIGS. 2, 4, 5, 6, 7A, 7B, 7C, 7D, and 7E, the IPM controller 22 includes a first, data-receiving processor module 88 (also referred to as a measurement processor module), and a second control processor 90, a modem 92, a failure alarm 94, and the power driver/current sensor module 78. The failure alarm 94 can be triggered by the IPM 22 sensing of the irregular conditions in the mold, as discussed above. The data-receiving processor module 88 receives temperature measurements and current measurements, as described in detail below. In this present invention, the control and measurement functions are split to different processors, because the measurement function is CPU intensive requiring much processor capability. It has been found that this is a less expensive control system than to use a single processing unit for both control and measurement functions.

Because measurement of temperature and current are CPU intensive, for a large number of zones, the data-receiving processor module 88 can require multiple processors. Thus, for the exemplary apparatus, shown in the drawings, which has 96 zones, there is a first measurement processor 88a that is used for zones 1-48, and a second measurement processor 88b that is used for zones 49-96. For an exemplary zone having one heater (such as heater 70) and one temperature sensor (such as sensor 76), each measurement processor 88a and 88b is receiving data signals from 96 sources (2×48).

Each measurement processor 88a, 88b provides measurement data to the control processor through cables 89a and 89b, respectively.

Figure 4:
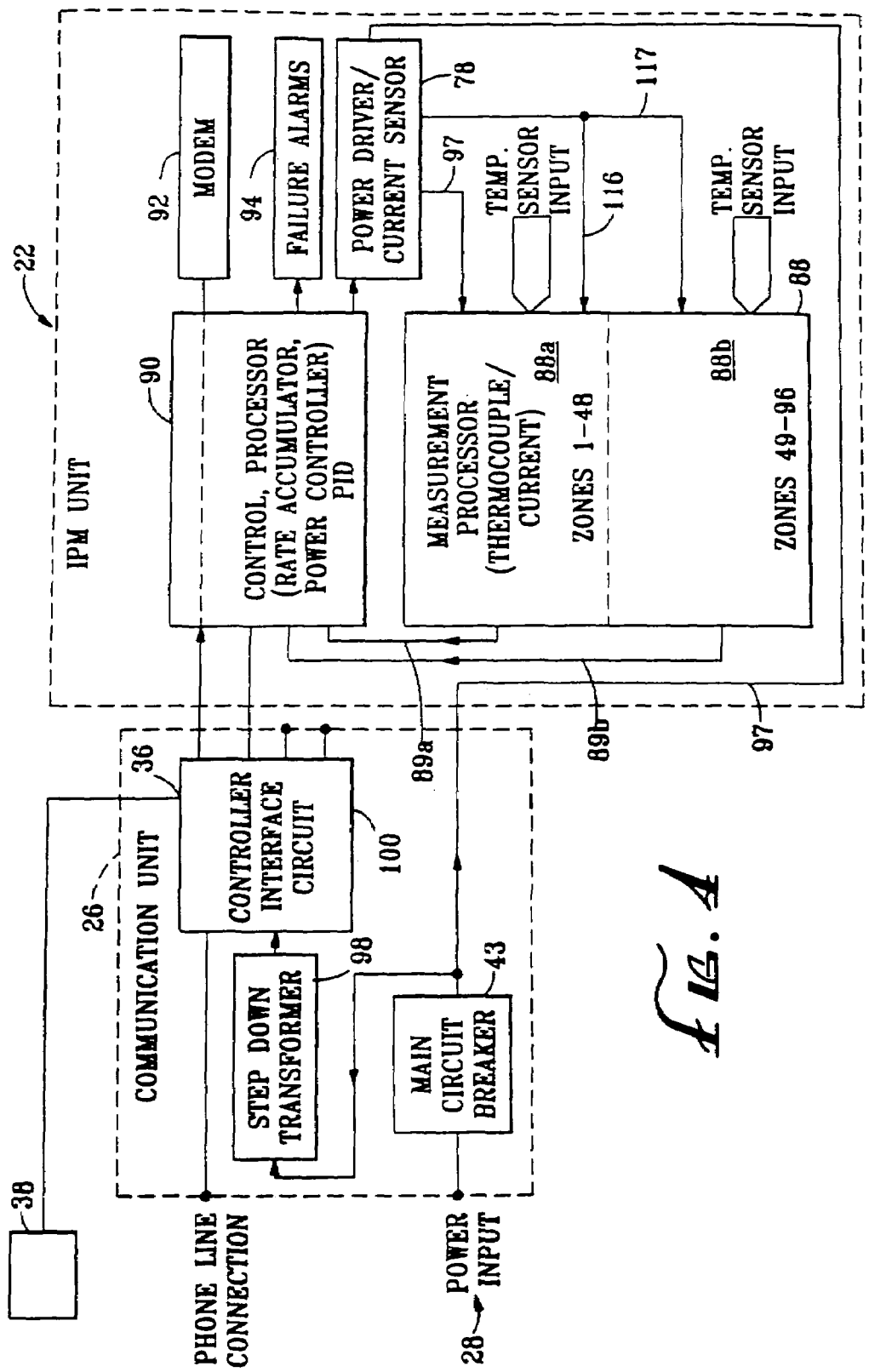
FIG. 4 is a block diagram showing the modules of the IPM and the relationship between modules of the IPM of the apparatus of FIG. 1.

As shown in FIG. 4, the communication unit 26 is separate from the IPM unit 22. In addition to the components described earlier, the communication unit 26 has a step down transformer 98 that reduces the input voltage, typically 240 volts, to a lower voltage, preferably about 24 volts. The reduced voltage from the transformer 98 is fed to a controller interface circuit 100 that supplies the reduced voltage power to the IPM 22, including the modem 92, the failure alarms 94, and the power driver/current sensor module 78.

The thermocouple sensors 74, 76, and 77 (FIG. 2) generate analog signals along the cables 85, 86, and 87. The signals are input through corresponding noise filters 102a, 102b, and 102c (FIG. 5), and into a multiplex circuit 104. A suitable multiplex circuit 104 is available from Analog Devices of Norwood, Mass., Model ADG 409BN. The filters 102 filter out any noise spikes introduced by the 240 volt supplied to the heaters, and serve to avoid disruption of the millivolt signals generated by the thermocouple sensors.

The parameters in memory 411 can be modified by inputting changes from the laptop computer 38 to the microprocessor 399. A flash memory 414 makes possible altering the software recorded in SRAM memory 411. Changes and modifications can also be made by the phone connection 39 to the modem 40. A calendar clock 416 provides all the time dependent functions such as the start-up control.

Figure 9:
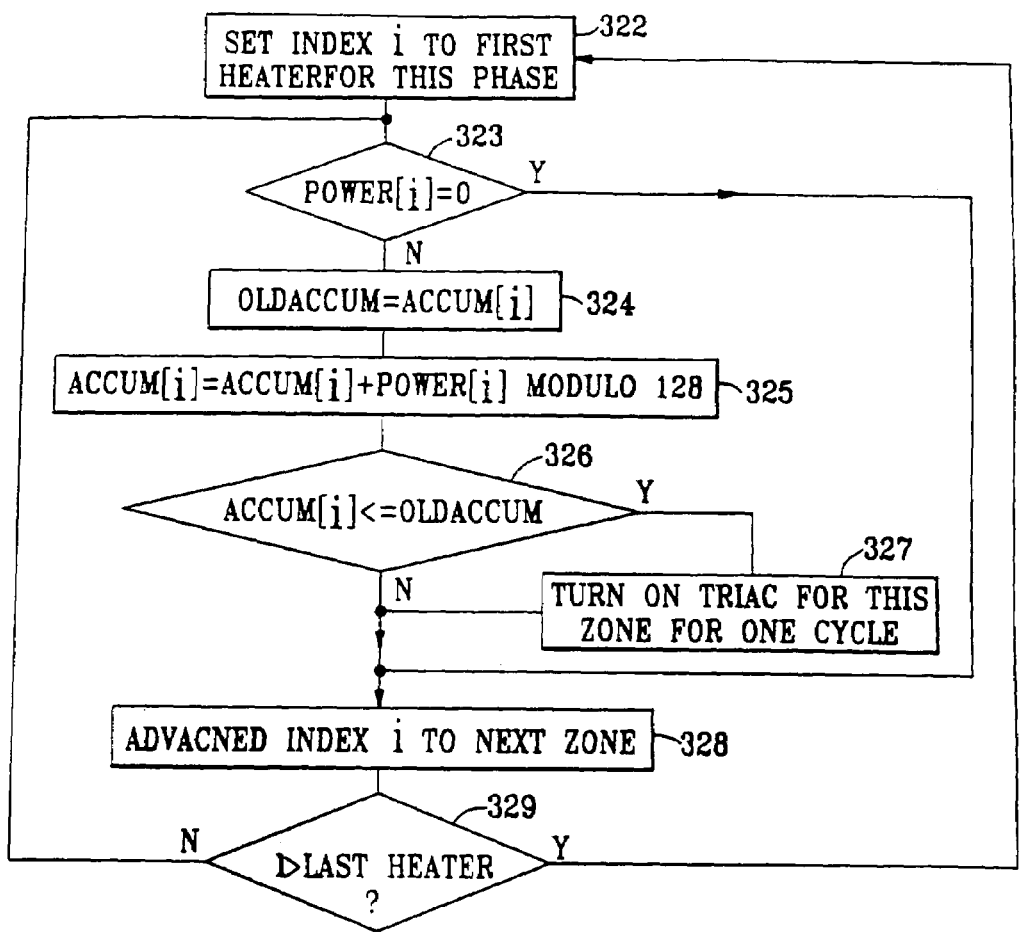
FIG. 9 is a flow chart of software that controls the triggering of application of power for heating the mold zones of the mold of FIG. 1.

There is shown for each heater [i] a software flow chart FIG. 9, Appendix A2, which provides a rate accumulator function for controlling the time when the CP[i] current is to be applied a heater P[i]. A first decision 322 (A2-36,70, 104) initiates the accumulator calculation. In step 323, the power, P[i], applied to the heater [i] is compared to zero (A2-39, 44, 73, 107, 78 and 112). The rate accumulator function is based on modulo arithmetic which means that the numbers are constrained to a finite range. For the purposes of the instant software program, a seven-bit binary number is chosen in the numerical range of 0 to 127 as the modulo number. The accumulator control involves a timing or rate function which depends on the cycles that comprise the AC wave form. Every zone is polled 60 times per second, i.e., once every cycle of the AC wave form. In view of the fact that the CP[i] is already determined, the question is timing the input to the heater. The rate accumulator performs according to the following equation:

$$\text{Modulo } 128(ACCUM[i]+CP[i]) \mathrel{<}= \text{ACCUMI}[i] \qquad \text{EQUATION 3}$$

where Modulo 128 is a modulo arithmetic number.

Figure 7A:
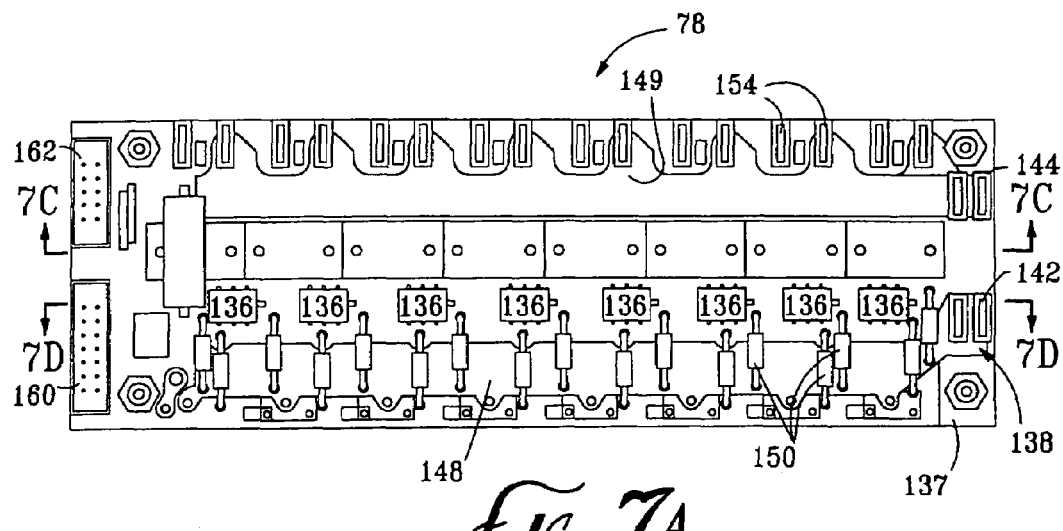
FIGS. 7A and 7B are top and bottom plan views, respectively, of a power driver unit of the IPM of FIG. 1 showing the arrangement of the components that form a two-sided circuit board.
Figure 7B:
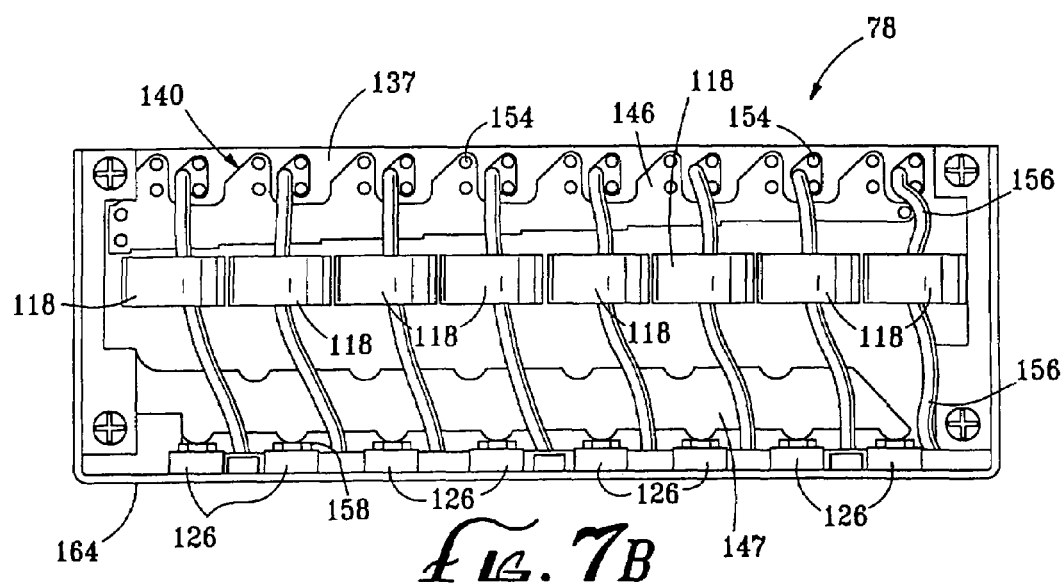
Figure 7E:
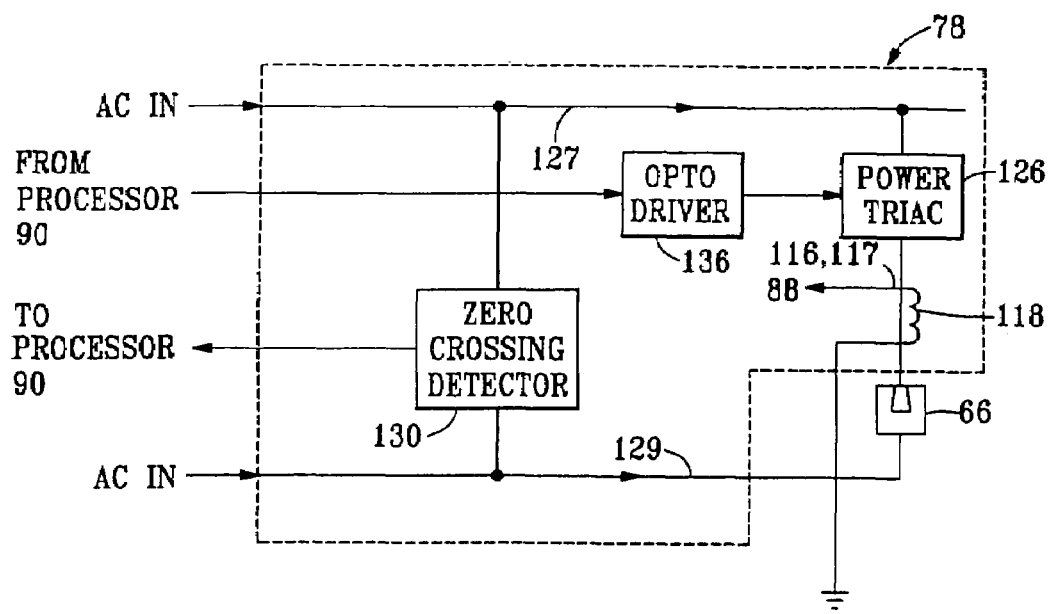
FIG. 7E is a wiring diagram of the power driver unit of FIGS. 7A and 7B that senses the current that is input to a processor module of the IPM.

FIG. 7E shows a circuit diagram representing a portion of the power driver unit 78 for one zone. In practice, a typical power driver unit 78 includes a series of the circuits shown in FIG. 7C, one for each heater. AC power is provided over AC conductors 127, 129, across which, connected in parallel, is a power driver switch 126 (also referred to as a power triac). The current transformer coil 118, in series with the power triac 126, measures current passing to the heater 66. A zero crossing interruptor 128 (FIG. 8) receives a zero crossing signal from a zero crossing detector 130 after passing through a band pass filter 132 (FIG. 8), which screens out unwanted noise from the AC power (FIG. 8). The power triac 126 is energized for applying power to the heater 66 in accordance with signals from the control processor 90 passing through an opto driver 136.

Referring to FIGS. 7A, 7B, 7C, and 7D, there is shown the structure of a typical power driver unit 78. As shown the power driver unit 78 comprises a circuit board 137 having a top circuit 138 and a bottom circuit 140 which are assembled back to back, and include the opto driver 136 and the power triacs 126.

AC (alternating current) power is input to the power driving unit 78 at terminals 142 and 144. Copper bus bars 147 and 148 on opposite sides of circuit board 137 connect to the input side of the triacs switches 126 located in the bottom circuit 140. The opto triac drivers V36 are connected to the bus bars 147 and 148 and the triacs 126 through an array of resistors 150. Heavy bus bars 146 and 149 on opposite sides of the circuit board 137 serve as a common return path to the AC terminal 144 directed to heaters through connectors 154. The conductive strips are formed from copper sheets having a weight basis of 4 ounces per square foot. It has been found that this weight of conductive copper strip minimizes the amount of heat generated in the circuits 138 and 140 of the power driver unit 78.

Current is conducted from bus bars 147 and 148 through an activated triac 126 through a wire 156. The current passes through the sensing transformers 118 to connectors 154 which pass the current to the heaters 66 (FIG. 7C), and is conducted via the bus bars 146 and 149 to the terminal 144. Connector 160 receives the heater on-off signal from the control processor 90 and connector 162 sends the current data to the data-receiving processor 88. Aluminum bracket 164 serves as a mounting bracket for the power driver unit 78, and as a heat sink for the power triacs 126.

The power driver unit 78 is equipped with the elements (eight opto drivers 136, eight power triacs 126, and eight transformers 118) necessary to provide power to eight zones. The power driving unit can be repeated or expanded to accommodate additional zones. The eight zones can be for one molding station, or more typically, multiple molding stations.

Referring to FIG. 6 and Appendix A1, there is set forth the flow chart of a PID that determines the integral error and calculates the power requirements for each zone. The computations in processor 90 are performed according to a PID ("Proportional Integral Differential") which has been modified according to A1 to avoid the risk of computer overflow. Overflow could result in applying excessive power to the heaters, causing production of defective parts, and possibly damage to the mold apparatus.

In each duty cycle (also referred to as a polling cycle) of the processor 90, all temperature sensors 70 and 74 and all current sensing transformers 118 are sampled at least one per second, and preferably every half second. In a first microprocessor step 264 (A1-53), index i is set to one of the zones, starting with i=0 for the first zone. An initial reading step 265 measures the present temperature of the zone PT (A1-61). In the next step, step 266, the temperature error (TE=PT—Target temperature) (A1-69) is determined. The difference between the present temperature PT and the Target temperature is the operational reference parameter. The differential error DE A1-70 is calculated in step 267, taking the difference between TE and the previous TE measured in a previous polling cycle. In step 268, A1-71, the sum integral error, ($\Sigma EI[i]=E[i]+TE$), is calculated.

At this point in the PID, limits on the sum integral error are imposed in order to avoid arithmetic overflow of the calculated power values, which could call for excessive damaging power input. Steps 269 and 270 prevent the power supply from applying a value of CP[i] greater than 100 percent. Steps 269, 269A, 270, and 270A (A1-76, 77, 79 and 80) place limits on the integral error between a positive maximum value and a negative maximum value to avoid overflow.

Step 271 (A1-86) performs a power requirement calculation according to the following equation:

$$CP[i]=[(KP[i]\times TE+KD[i]\times DE)\times 1000+KI[i]\times \Sigma E[i]]/1000 \qquad \text{Equation 1}$$

where: $KP[i]$=experimentally determined proportionality constant for PID algorithm for heater [i]
$KI[i]$=experimentally determined integral constant for PID algorithm for heater [i]
TE=proportional temperature error calculated in step 266
DE=differential temperature error calculated in step 267
$KD[i]$=experimentally determined differential constant for heater [i]
$\Sigma E[i]$=integral temperature error for zone i determined in step 268, subject to the limits of steps 269, 269A, 270, and 278

The value for each constant "K[i]" is determined empirically by observing the rate at which each respective heater [i] is brought to its operating temperature. Multiplying the proportional and differential terms by 1000, (A1-86) simply allows the PID constants KP, KI and KD to be conveniently expressed as reasonably sized integers. Having established the limits for the integral error, the calculated power CP[i] is calculated according to the PID formula shown in step 271, (Equation 1).

If the value for CP[i] is less than 0, it is set to zero in steps 272 and 272A (A1-91, 92). If CP[i] is not less than zero, and is greater than 1000, it is set to 1000 in steps 273 and 273A (A1-88, 89). Step 273A is equivalent to a power value of 100%, because power is calculated in units of 1/10%, so 1000 means 100.0%. Calculations are done as integers for processing speed. The temperature error (TE) and measured RMS heater current, discussed hereinafter in connection with the application of power, are compared to limits in steps 274 and 275 to determine if there is a temperature or current alarm condition, for possible activation of alarms.

For example, a temperature alarm is activated in step 274 (A1-82) if the set temperature is exceeded by a predetermined value, such as by five degrees. Similarly, a power current alarm is activated at step 275 (A1-82), if the current level is outside a specified range.

The power level CP[i] in the range of 0-1000 is converted in step 276 to Power [i] in the range of 0-128 for later use by the modulo "N" rate accumulator. In the next step 277 (A1-97), the temperature error for the zone is reserved for use in the next polling cycle (A1-53). The last step 279 (A1-53) determines whether the program has polled all of the zones during the duty cycle. If it has, polling is repeated starting with zone 1. If it has not, polling proceeds to the next zone.

Application of Power

Returning now to FIG. 5, the measurement processors 88a and 88b receive digitized signals at the rate of 120 measurements per one half second duty cycle from each current sensor and eight measurements per one half second duty cycle for each temperature sensor. This imposes a significant calculation burden on the microprocessor 123 of each measurement processor to calculate RMS current and temperature values. During each 0.5 second PID duty cycle, each current sensor 118 (FIG. 7c) is read 120 times, that is, four equally spaced readings for each cycle at 60 Hz. For 50 Hz, four evenly spaced readings occur every 1/50th second.

The calculation of the RMS ("Root Mean Square") value for temperature and current values, requires that the calculation be accomplished more rapidly in order that the system keep up with the volume of data. In order to deal with the volume of data, the following equation for N bit data (Appendix A4), calculates the sums of each of the 2N bit partial products and combines these partial sums into a 4N bit final sum:

$$RMS = SUM[(AL \times AL)] + SUM[(AH \times AL)] \times 2 \times 2^N + SUM[(AH \times AH)] \times 2^{2N}$$

EQUATION 2 where AL is a low N bits for the 2N bit data, and AH is the high N bits of the 2N bit data. These sums can be represented in 3N bits without the possibility of overflow provided the sum is no more than $2^N$ readings per measurement cycle.

Processor 90 determines when to trigger the power switch unit 78 determined by a cycle skipping algorithm. Power is applied to each zone by turning on the triac 126 (FIG. 7B) of the power driving unit 78 for one or more complete cycles of the 50/60 Hz AC wave form. The controlling software always turns "on" and "off" at the zero crossing points of the AC wave form which minimizes both generated noise and power dissipation. The modified PID algorithm in the processor operates on a duty cycle of 0.5 seconds which is thirty full cycles of the AC wave form. It is desirable to control the power level to a much finer resolution than once in thirty discrete steps. This is accomplished by averaging out the CP[i] over a period of time by applying a wave accumulator function to the average value of the applied power, CP[i], (Equation 1), over the period of measurement to determine when to activate the triac.

Referring how to the block diagram of FIG. 8, there is illustrated the structure of the control processor 90 which includes a microprocessor 399. The microprocessor 399 computes the timing when the CP[i] is to be input to the heaters. The processor 90 includes the microprocessor 399 and CMOS standard random access memory 411 ("CMOS SRAM") that stores operational parameters, such as target temperatures, heat current levels, and constants in the above equations. The microprocessor 399 receives input for component weight control, mold spacing, and component ejection from the mold. The CMOS SRAM 411 is available from Hitachi identified as Model HM 628128. A suitable microprocessor is available from Intel, Santa Clara, Calif., and operates at 25 MHz.

The processor 90 is connected to certain additional control elements such as the static random access memory (SRAM) 411, the flash memory 414 that enables making changes to the set of operational reference parameters, the calendar clock 416 and the battery and power failure detect circuits 418. All the calculations performed in microprocessor 399 are stored in the CMOS SRAM 411.

The processor 88 sends its RMS current measurement (as shown in Appendix A4) and average temperature measurements to the microprocessor 399 of the control processor 90, which performs the PID calculation of FIG. 6 (as specified in Appendix A1).

The calculations made by the microprocessor 399 determine the 3 phase power to be delivered to the heaters by the power drivers 78. The power drivers 78 are controlled by on/off signals output by microprocessor 399 to buffer drivers 519. These on/off signals are synchronized with the zero crossings of the 3 phase AC waveforms. The zero crossing points are sensed by the zero crossing detectors 130 on the power drivers 78. These zero crossing signals are first filtered by the 60 Hz bandpass filters 132 to remove any unwanted noise, and then passed through the zero crossing interrupter 128 to generate zero crossing interrupts to the microprocessor 399. In FIG. 8 there are depicted buffer driver outputs for 12 power drivers, each of which can control The IPM 22 is effective in managing the start-up of a multiple zone apparatus from a nonoperating condition bringing it to full operation. Referring to the flow chart of FIG. 10 and the plots of time v. temperature in FIGS. 11A and 11B, there is shown the start-up system of the IPM 22. The start-up of a new operation is best carried out with each of the plurality of zones/heaters progressively heating up from a starting state and reaching an operational state at the same time. Careful start-up avoids damagingyie heat sensitive materials within the system. power to 8 heaters, for a total of 96 heaters.

For purposes of illustration, if it is assumed that the power is being provided to the heater [i] at 25% of capacity, the rate accumulator activates the opto drive 136 at the zero crossing of the AC cycle, and then turns it off for the next three cycles, which provides a 25% power input. Using a 7 bit modulo number of 128, accumulator overflow occurs when the accumulator exceeds 127, thereby firing the opto drive 136 at the zero crossing point, closest to that signal.

Referring to decision steps 324 and 325 (A2-40, 45, 74, 79, 108 and 113), the triggering calculation is made by adding to accumulator [i] the power percentage, power [i] (determined in step 276) multiplied by modulo number 128 (7 bit number). When the accumulator value [i] is less than or equal to the old accumulator value, indicating an overflow of the modulo 128 accumulator, the triac is fired for one cycle as shown in step 326 (A2-40, 45, 74, 79, 108 and 113). If the decision in 326 is "no" for the reason that the new accumulator value is greater than the old accumulator value, then in a step 327 (A2-41, 42, 75, 80, 109 and 114) the process merely advances to the next heater (A2-36, 70 and 104) since no power input is required. The next decision 329 is to determine whether the zone just measured completes the cycle (A2-36, 70, 104). The microprocessor 399 (FIG. 8), in response to the decision in 326, sends a signal to the switch 136 to fire the appropriate power input to the appropriate heater.

A preferred start-up procedure according to the present invention will now be discussed. The calendar clock 416 of the processor 90 is set at zero and a ramp up time (RUT) is programmed into the microprocessor 399 to correspond to the longest period of time required for a zone heater to reach its operational temperature. It will be understood that each heater has a different thermal mass which results in different rates for a heater to heat the corresponding mold portion and reach its operating temperature.

Application of Chilling Water

Figure 13:
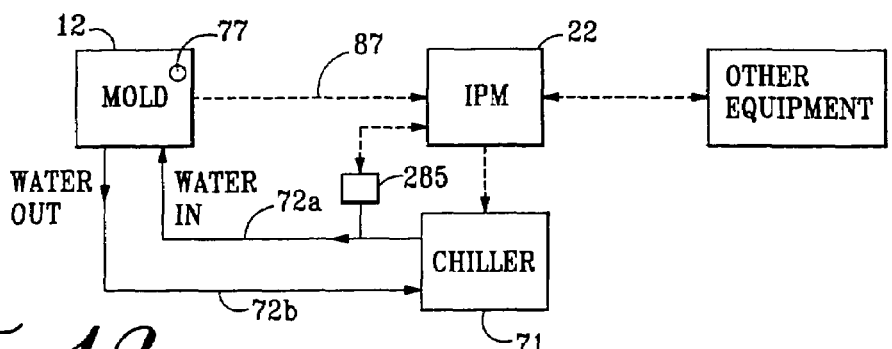
FIG. 13 is a schematic view showing a closed loop control of a chilling function for the mold of FIG. 1, and the use of the IPM with other equipment relating to the injection molding operation.

The same general algorithm is used for control of the chiller 71, where the parameter monitored and controlled is temperature of the output water from the chiller 71 rather than power delivered to the heaters. The chiller is operated at substantially constant pressure and substantially constant flow rate, with only the output temperature being varied in response to the temperature sensed by the sensor 77. As shown in FIG. 13, a temperature sensor 285 detects the temperature of output chilled water and sends an analog signal to the IPM 22, where the signal is digitized and processed just as the current signals sent by the transformers 118 are processed.

Start-Up Control

Figure 10:
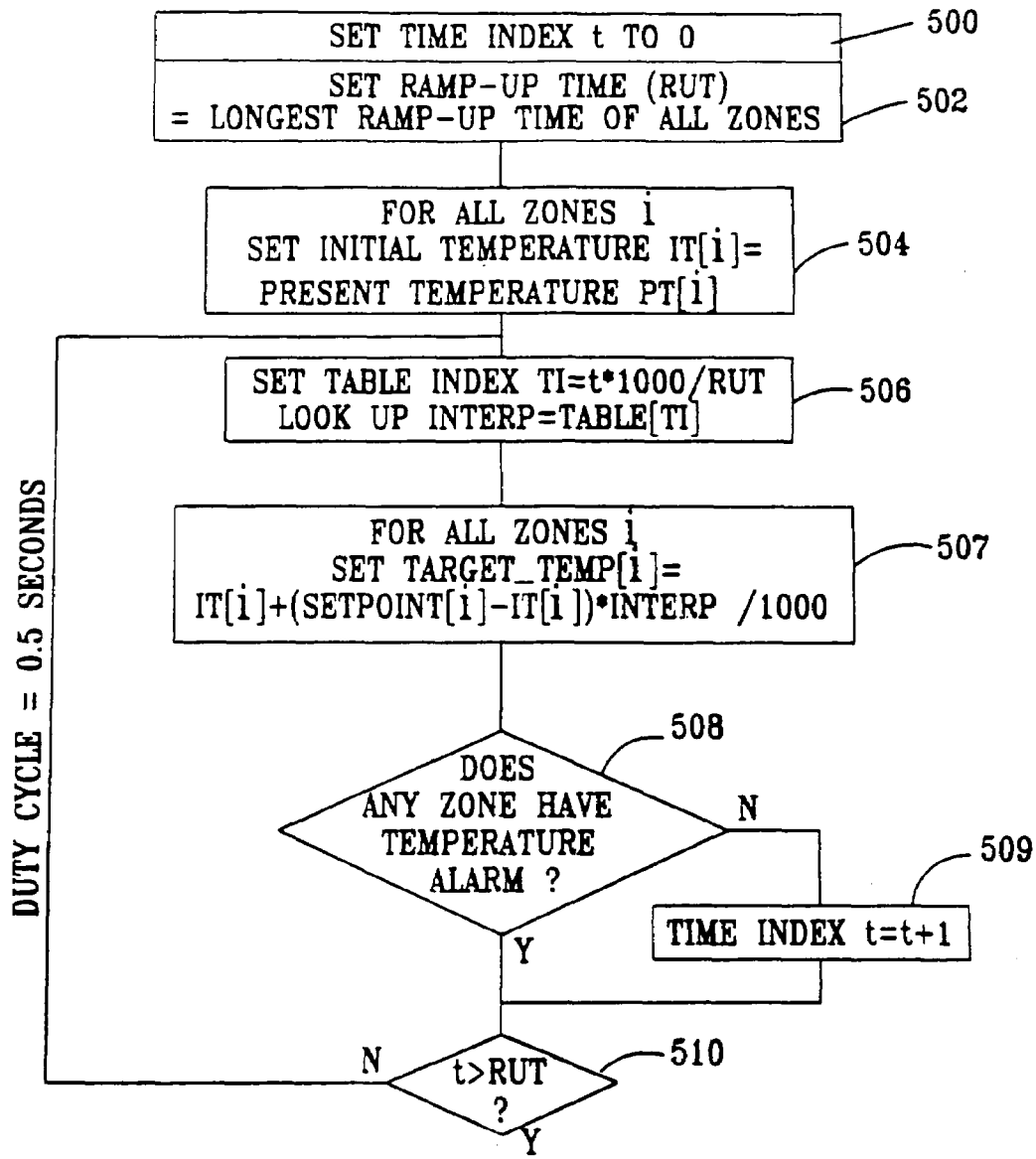
FIG. 10 is a flow chart of the software that controls the power increments applied to each heater of the mold of FIG. 1 in bringing the zones to the operational reference temperature.
Figure 11A:
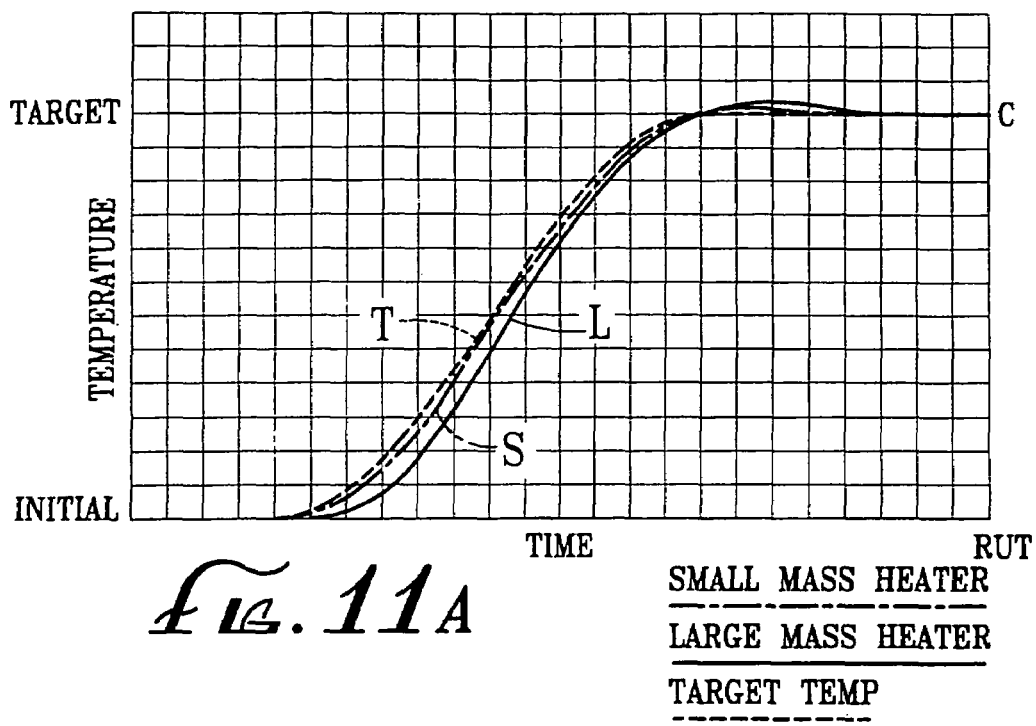
FIG. 11A is a time vs. temperature plot of the start-up technique of this invention for bringing each heater in the multiple zones to a set point temperature of the mold of FIG. 1.

Referring now to FIG. 10 and Appendix 3, the system in the first step 500 (A3-31-35) sets a time t to 0 in the calendar clock 416 in the controller 90 and a value for RUT (ramp up time) in step 502 (A3-70-30), which is based on the longest heat-up time for all zones. The heat-up time is calculated based on the time constants of the heaters and the required temperature rise. Longer time constants and larger temperature rises result in longer calculated heat-up times while shorter time constants and lower temperature results in shorter warm-up times. All of the zones in step 504 (A3-10), are set with an initial temperature IT [i], which represents the present temperature of the system PT[i] at start-up.

In step 506 (A3-39, 40) the software refers to a look-up table which defines the shape of the warm-up curve. The software selects a Table Index, TI, in terms of the current time multiplied by a factor of 1000 and divided by the RUT. The look-up table provides an incremental step rate at which power is applied to each heater so that all heaters proceed to follow a warm-up curve that approximates the sinusoidal curve shown in FIG. 11A so that all zones reach their respective desired start-up temperature at about the same time. The curve S represents the temperature profile of the heater with the smallest thermal mass and L represents the profile of the heater with the largest thermal mass. Both curves S and L follow the target curve T, determined empirically, which indicates that at no time during the start-up, neither curve S or L advance to the target temperature before the other. The rise of curve L gradually slows and levels off at the end of the warm-up cycle at the position C. The information from the look-up table is utilized to set the operational zone temperature calculated according to the equation:

$$IT[i]+(\text{set point}[i]-IT[i]) \times interp/1000. \qquad \text{EQUATION 4}$$

Process step 507 (A1-66, 67) establishes an intermediate setpoint temperature between the initial temperature IT[i] and the final setpoint [i] established by Equation 4 above. All zones follow the same smooth temperature rise S curve determined by the lookup table, so that all zones arrive at the final setpoint temperature at the same time.

In step 508 (A1-41) it is determined whether any zone has exceeded, or is lagging behind, its set point temperature. If no zone is lagging, then the clock 426 indexes the application of CP to the next step 509 (A1-42). If a zone is lagging, then the temperature has deviated too far from the warm up curve and the progression of the start-up is halted. Step 510 (A1-38) determines if the elapsed time t has exceeded the RUT indicating the end of the start-up cycle.

Figure 11B:
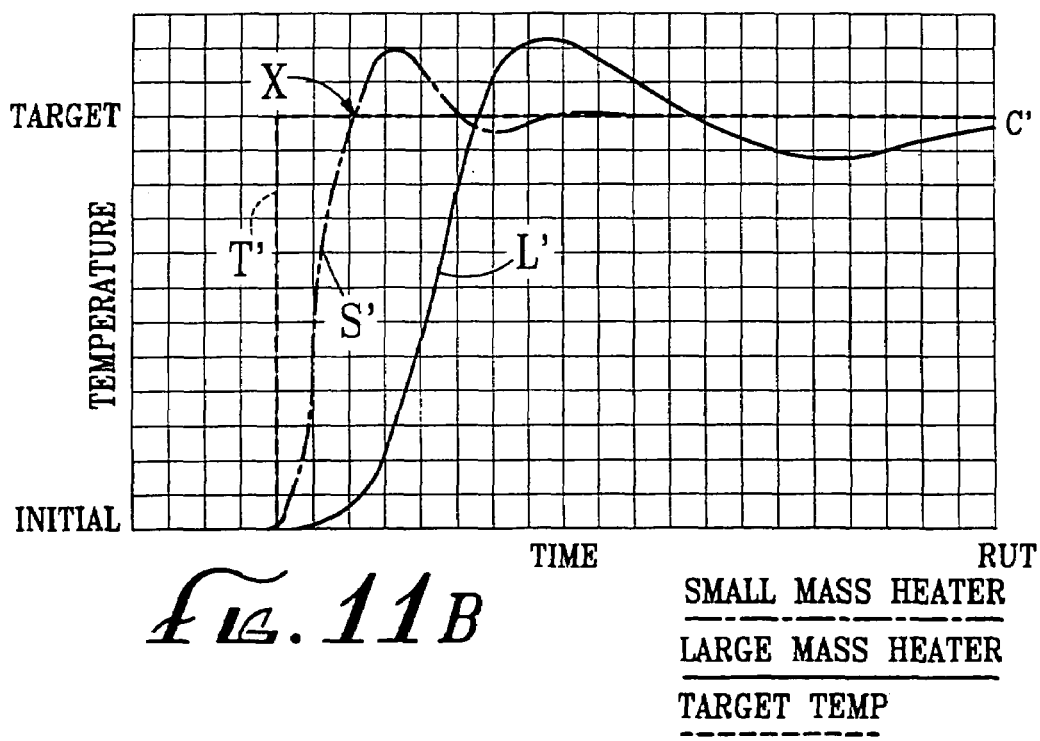
FIG. 11B is a time vs. temperature plot of the prior art start-up control for bringing multiple heaters to a set point temperature.

The curves in FIG. 11B are a plot of the time and temperature function of the known prior art start-up techniques for target temperature T' and the smaller heaters, S', and larger heaters, L'. This prior art approach is to have the smaller heaters reach the target temperature before the larger heaters. In fact, curve L' is at the target temperature while S' is still at a very low temperature at X on the time coordinate. It will be observed that the curve L' overshoots the target T' for the reason that it is still being applied power and it undershoots the set point temperature before it reaches the RUT at the end of the cycle. Unlike the start-up system shown in FIG. 11B, the technique of the present invention results in all zones reaching their start-up temperatures simultaneously.

Pressure Control

The transducer 52, shown in FIG. 3, was described above with regard to making certain that the cavity plate insert 19 and the core retainer plate 16 are restored to their original position after every time the mold opens to eject molded components. The transducer 52 can also be used to monitor the injection process to make certain that there is not excessive pressure in the mold cavity with the result that the cavity plate insert 19 and the core retainer plate 16 separate at the parting line, with resultant formation of flash. If during the resin injection phase, the resin pressure is too high such that the pressure device (such as mechanical or hydraulic pressure) used to keep the mold parts together is overcome, then the transducer 52 detects lack of engagement between projection 16c and the recess 19c, and transmits a signal. This signal can alert the operator to the need to manually increase pressure, and/or sound an alarm, and/or be incorporated into a closed loop system where pressure provided by the mold hydraulic system 299 (FIG. 3) is automatically increased under control of the IPM 22.

Remote Access Control

Figure 12:
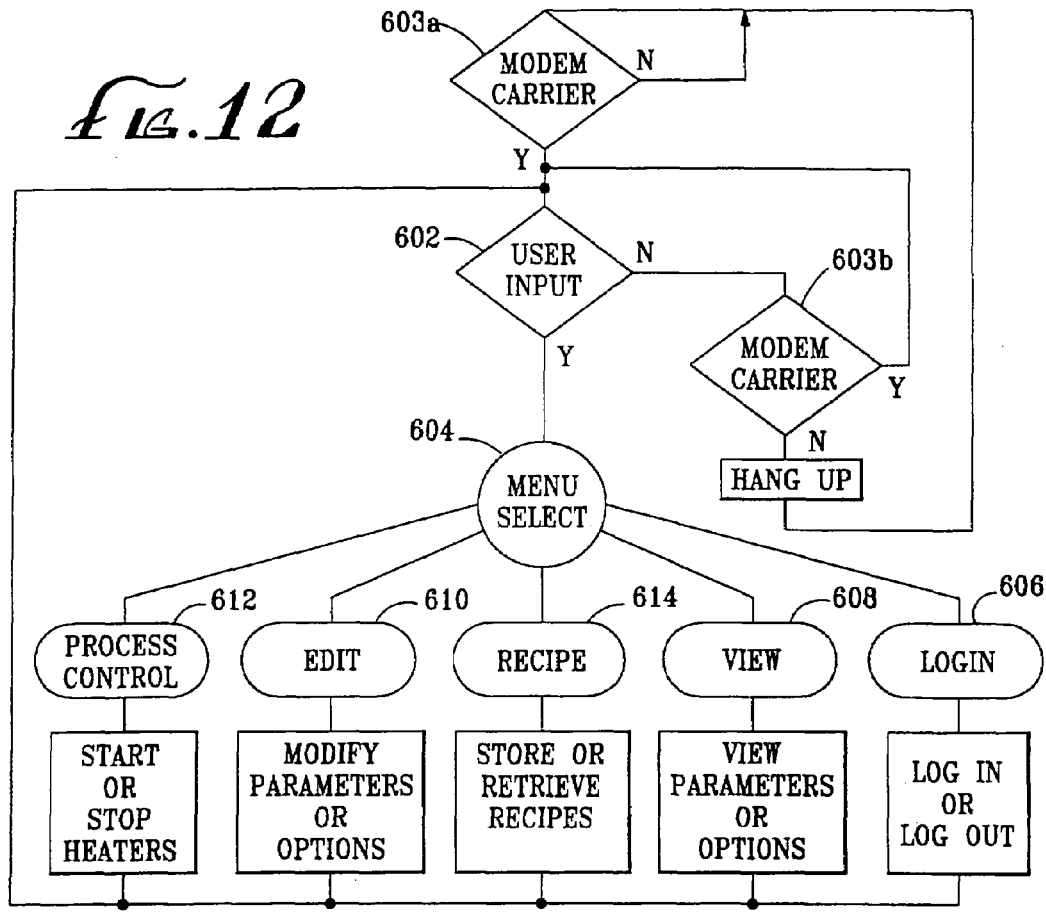
FIG. 12 is a flow chart of the software for accessing the IPM of FIG. 1 from a remote location.

The system can be controlled by an operator from a remote location as shown in FIGS. 8 and 12 by accessing the modem 40. Subject to an appropriate password by user input 602, a remote PC (not shown) can communicate with the controller when the modem is detected in steps 603a and 603b. The operator has access to a menu 604 which can select several system functions for information or modification. There is a log in/log out function 606. The operating conditions which are then in effect at the time the operator accesses the PC can be changed by user input 602. When the parameters of the system need revision or changing, the operator can access an edit function 610, which can make any required changes to the conditions in the processor 90. Function item 608 can be used to view current operating conditions and settings. Function item 612 can be used to start or stop heaters. Function item 614 can be used to save or retrieve a complete set of operational parameters (called a "recipe") from memory. The remote access program is concluded by logging out of the system, or by loss of carrier to the modem.

Thus, through the IPM it is possible for the mold to communicate remotely the condition of the mold, including operating conditions, faults, errors, safety, and any diagnostics.

Interface with Other Apparatus

An advantage of the IPM 22 is that it can be used to interface the mold 12 with other support equipment, as shown in FIG. 13. This can include chillers, blenders, robots, parts handling equipment, other molds, and injection molding machines.

Exemplary Advantages

The present invention has significant advantages. For the first time, a mold is able to self control, without the use of outside controllers, its functions, pressures, movement, safety, ejection, and temperatures. The IPM 22 can be used for controlling each step of the molding process at each molding station. Moreover, chilling water and the pressure at the parting line can be controlled as part of a closed loop function, without operator interaction. Use of the video camera and scale allow remote monitoring of product quality. Furthermore, setup is simple and fast, with a single plug providing the input power and signals, and output signals to the mold, including through the IPM 22. Other advantages are associated with the improved start-up procedure, and fast response time and accurate control achieved with the multiple processors.

Although the present invention has been described in considerable detail with reference to certain preferred versions thereof, other versions are possible. Therefore, the spirit and scope of the appended claims should not be limited to the description of the preferred versions contained herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" for "step" clause as specified in 35 U.S.C. § 112.

What is claimed is:

1. An injection mold mounted process control and data acquisition apparatus comprising:
    an injection mold;
    a process control and data acquisition system mounted on said injection mold; and
    at least one injection mold-located sensor providing information from said injection mold to the mold mounted process control and data acquisition system; said mold mounted process control and data acquisition system comprising:
        at least one sensor input circuit cable;
        at least one control output cable;
        at least one switched power device;
        at least one microprocessor or logic device necessary for control of a process;
        at least one analog-digital signal converter for converting analog sensor signals located within the injection mold to digital signals;
        at least one multiplexing device to deliver an analog signal to an input device within the mold mounted process control and data acquisition apparatus;
        at least one data transmission device to send and receive data in analog or digital format to an attached or remote communicating device;
        at least one memory device located within the mold mounted process control and data acquisition apparatus to store data for use in or in conjunction with control processes, control algorithms, or data storage; and
        a cooling system element located within the process control and data acquisition system.

2. An injection mold mounted process control and data acquisition apparatus as set forth in claim 1, wherein said process control and data acquisition system is attached to the injection mold with or without a mold junction box, where analog or digital devices and analog or digitally controlled devices connect from within the injection mold.

3. An injection mold mounted process control and data acquisition apparatus as set forth in claim 1, wherein said apparatus includes a housing which encases the at least one sensor input cable and the at least one control output cable of said process control and data acquisition system, protecting them from damage from elements.

4. An injection mold mounted process control and data acquisition apparatus as set forth in claim 1, wherein said process control and data acquisition system includes a control cable which delivers an output which controls a process control device located on or within said injection mold.

5. An injection mold mounted process control and data acquisition apparatus comprising:
    an injection mold;
    a process control and data acquisition system mounted on said injection mold; and
    at least one injection mold-located sensor providing information from said injection mold to the mold mounted process control and data acquisition system; said mold mounted process control and data acquisition system comprising:
        at least one sensor input circuit cable;
        at least one control output cable;
        at least one switched power device;
        at least one microprocessor or logic device necessary for control of a process;
        at least one analog-digital signal converter for converting analog sensor signals located within the injection mold to digital signals;
        at least one multiplexing device to deliver an analog signal to an input device within the mold mounted process control and data acquisition apparatus;
        at least one data transmission device to send and receive data in analog or digital format to an attached or remote communicating device;
        at least one memory device located within the mold mounted process control and data acquisition apparatus to store data for use in or in conjunction with control processes, control algorithms, or data storage; and
        a cooling element located within the process control and data acquisition system;
    wherein said process control and data acquisition system is placed within a housing and includes a cooling element to remove excess heat generated by analog and or digital components within the housing to increase a reliability of the components by keeping their temperature to a minimum.

6. An injection mold-mounted process control and data acquisition apparatus comprising:
    an injection mold having associated controllable parameters;
    at least one controlled element mounted on said injection mold which varies a respective one of said controllable parameters in response to a control signal;
    at least one injection mold-located sensor which produces an output that varies with a respective one of said controllable parameters;
    a thermally-isolated housing mounted to said injection mold; and
    processing circuitry positioned within said thermally-isolated housing, said circuitry coupled to said at least one injection mold-located sensor output and said at least one controlled element and arranged to provide at least one of said control signals;
    wherein said processing circuitry comprises:
    an analog-to-digital converter (ADC) which converts said at least one injection mold-located sensor output to a digital signal; and
    a microprocessor which receives said digital signal and is arranged to provide at least one of said control signals.

7. The apparatus of claim 6, wherein said at least one controlled element comprises a plurality of controlled elements and said at least one injection mold-located sensor comprises a plurality of injection mold-located sensors, said processing circuitry further comprising a multiplexer which selectively connects one of said sensor outputs to said ADC, said microprocessor arranged to produce a plurality of said control signals to respective ones of said controlled elements.

8. An injection mold mounted process control and data acquisition apparatus comprising:
    an injection mold;
    a process control and data acquisition system mounted on said injection mold; and
    at least one injection mold-located sensor providing information from said injection mold to the mold mounted process control and data acquisition system; said mold mounted process control and data acquisition system comprising:
        at least one sensor input cable;
        at least one control output cable;

at least one switched power device;

at least one microprocessor necessary for control of a process;

at least one analog-digital signal converter for converting analog sensor signals located within the injection mold to digital signals;

at least one multiplexing device to deliver an analog signal to an input device within the mold mounted process control and data acquisition apparatus;

at least one data transmission device to send and receive data in analog or digital format to an attached or remote communicating device; and at least one memory device located within the mold mounted process control and data acquisition apparatus to store data for use in or in conjunction with control processes, control algorithms, or data storage.

* * * * *